United States Patent [11] 3,599,208

[72] Inventor Robert P. Nelson
West Islip, N.Y.
[21] Appl. No 819,309
[22] Filed Apr. 25, 1969
[45] Patented Aug. 10, 1971
[73] Assignee The United States of America as represented by the Secretary of the Navy

[54] RADAR SYSTEM
5 Claims, 7 Drawing Figs.
[52] U.S. Cl. .......... 343/7 A, 343/16 M, 343/17.1 R
[51] Int. Cl. .......... G01s 9/22
[50] Field of Search .......... 343/7 R, 16 M, 17.1

[56] References Cited
UNITED STATES PATENTS
3,130,402  4/1964  Kuck .......... 343/16 M X
3,283,322  11/1966  Hovda et al. .......... 343/16 M
3,392,387  7/1968  Kirkpatrick .......... 343/17.1

Primary Examiner—T. H. Tubbesing
Attorneys—Edgar J. Brower, Arthur L. Branning, T. O. Watson, Jr. and R. R. Anderson ABSTRACT: The invention relates to a radar system for enhancing the reception of desired echoes by the elimination of background clutter. The system comprises a monopulse radar system provided with a quadrature error detector wherein the magnitude of the quadrature error signal is used to control the gain or sensitivity of the monopulse receiver

INVENTOR
ROBERT P. NELSON

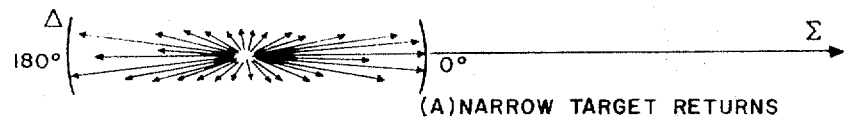
(A) NARROW TARGET RETURNS
FIG. 2a
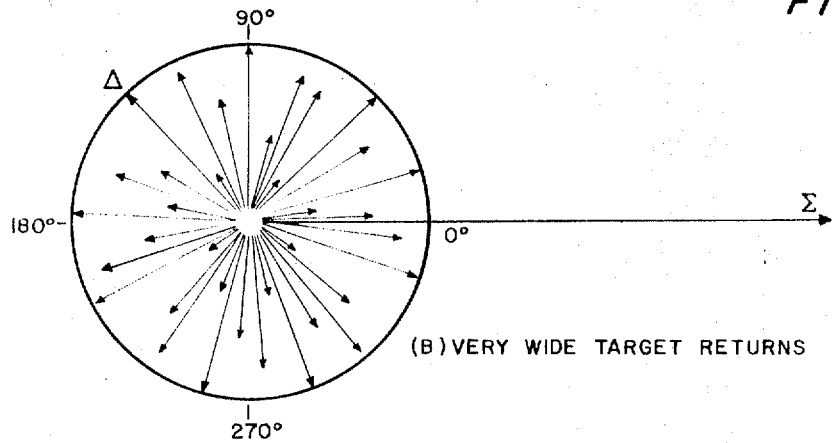
(B) VERY WIDE TARGET RETURNS
NORMALIZED AMPLITUDE AND PHASE RELATIONS IN SUM AND DIFFERENCE SIGNALS DUE TO NARROW AND WIDE TARGETS AS SEEN BY A MONOPULSE RADAR
FIG. 2b
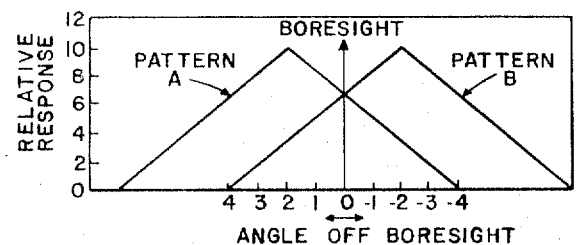
NOTE: BOTH PATTERNS HAVE EQUAL PHASE DELAY NOT AFFECTED BY ANGLE OFF BORESIGHT
FIG. 3
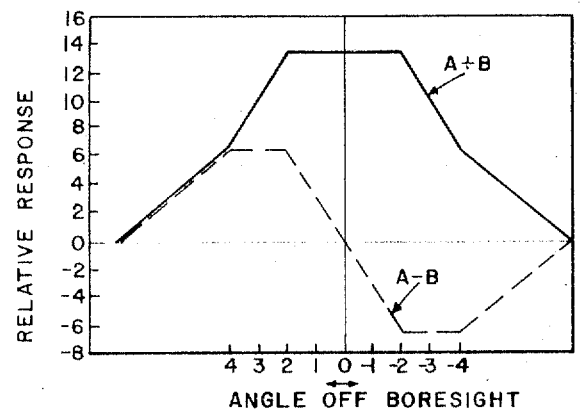
IDEALIZED RESPONSE CHARACTERISTICS OF MONOPULSE ANTENNA AND COMPARATOR

CASE 1
SINGLE UNIT TARGET
ON BORESIGHT

NOTE: NO Q△ PRODUCED

CASE 2
SINGLE UNIT TARGET
OFF BORESIGHT

NOTE: NO Q△ PRODUCED

VECTOR RELATIONSHIP FOR A SINGLE POINT TARGET

VECTOR RELATIONSHIPS FOR TWO EQUAL TARGETS
SEPERATED IN ANGLE

VECTOR RELATIONSHIPS FOR TWO EQUAL TARGETS
WITH INCREASED ANGLE SEPARATION

RADAR SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to radar systems and, more particularly, to radar systems for the enhancing of desired echoes while suppressing background clutter.

Clutter may be described as echoes that result from scatter on the surface of ground or water or any turbulent condition on such surface. Clutter differs from noise voltages in that noise voltages are random in nature whereas clutter echo is partially repeated from scan-to-scan on the radar scope. Sea clutter is caused by scattering of reflected energy from turbulence on the sea surface.

Various methods and apparatus for suppressing clutter are known. One of the most widely known methods is that of the STC or sensitivity time control. With STC the sensitivity of the receiver is reduced during the initial part of the receiving time below the level at which the clutter echoes are being returned. Beyond the clutter range the sensitivity is again returned to normal. During the time interval at which the signals are being received from the clutter range only the target echoes producing stronger return signals than that of the clutter are presented on the radarscope. The disadvantage of the sensitivity time control method, however, is that signals of equal or lesser magnitude than the clutter echo are also below the operating range of the less sensitive receiver and thus they are lost as well as the clutter.

Operation or radar equipment in an adverse weather environment, particularly those equipments which employ frequency bands of 5,000 mc./second and higher, is plagued by echoes caused by backscatter of energy from water vapor and precipitation. These weather echoes lead to confusion of the operator and lower the probability of recognizing and acquiring desired targets even though the desired targets may be separated from the clutter in range, angle and/or magnitude. In the case of radar sets employing automatic detection devices, target acquisition is usually based on receiving echoes exceeding a minimum magnitude. Unfortunately, the minimum magnitude is also exceeded by much of the clutter echo and a severe false alarm problem results.

Another well-known method of eliminating disturbances such as sea or ground clutter is that of the moving target indicator or the MTI radar. In this system, successive scans of the received energy are compared. Clutter presented on one scan is not necessarily presented in the same magnitude in a succeeding scan. Therefore, the MTI system would not operate effectively to eliminate rain echoes or other rapidly varying clutter in the radar system.

The obvious solution of employing lower frequencies is often denied due to constraints of size and desired angular accuracy. Similarly, circular polarization techniques, while offering a reasonable measure of subclutter visibility, are not always practical to employ, and when employed cause a reduction in target echo which may limit the useful range of the radar. For optimum detection of targets in clutter, it is, therefore, also desirable to use other differences in the signature of target and clutter in addition to the different depolarization effects of raindrops and more complex targets.

SUMMARY OF THE INVENTION

The echo characteristics of targets having a large extent in angle such as weather clutter, differ from those whose angular extent is small. This characteristic is discernible by radar equipment employing monopulse angle sensing antennas and having a sum channel and at least one angle difference channel. The signature difference lies in a decorrelation of the phase of the antenna difference signals relative to the phase of the antenna sum signals for extended targets.

This characteristic may be exploited by quadrature channel processing which consists of determining the relative phase of the sum and difference signals or the magnitude of the quadrature component of the difference and of modifying the characteristics of the receiver and/or thresholding device to prevent alarms on signals which are identified as clutter. One possible means for mechanizing this technique is shown in the following disclosure. Note that this technique does not itself result in a subclutter visibility. It will, however, allow the receiver to operate at maximum usable sensitivity without false alarms at all times. It is also fully compatible with other recognition techniques such as circular polarization and pulse length discrimination.

It is clear that the instant invention offers many improvements over the undesirable structure and operation of the prior art devices. Unlike the prior devices, the present invention reliably enchances the reception of desired echoes by the elimination of background clutter, effecting this enhancement through the use of a monopulse radar system provided with a quadrature error detector.

An object of the present invention is the provision of a radar system.

Another object of the present invention is the provision of a radar system which enhances the reception of desired echoes.

Still another object is the provision of a radar system which utilizes the quadrature error voltage for signal enhancement.

Yet another object is the provision of a radar system which utilizes the quadrature error voltage to control receiver sensitivity.

Yet another object is the provision of a radar system in which the quadrature error voltage is not used for display.

Other objects, advantages and novel features of the invention will become apparent from the following detailed description of the invention when considered in conjunction with the accompanying drawings.

BRIEF DESCRIPTION OF THE DRAWINGS

FIG. 2 shows the normalized amplitude and phase relations in sum and difference signals due to narrow and wide targets as seen by a monopulse radar;

FIG. 3 shows idealized response characteristics of monopulse antenna and comparator;

DESCRIPTION OF THE PREFERRED EMBODIMENTS

Figure 1:
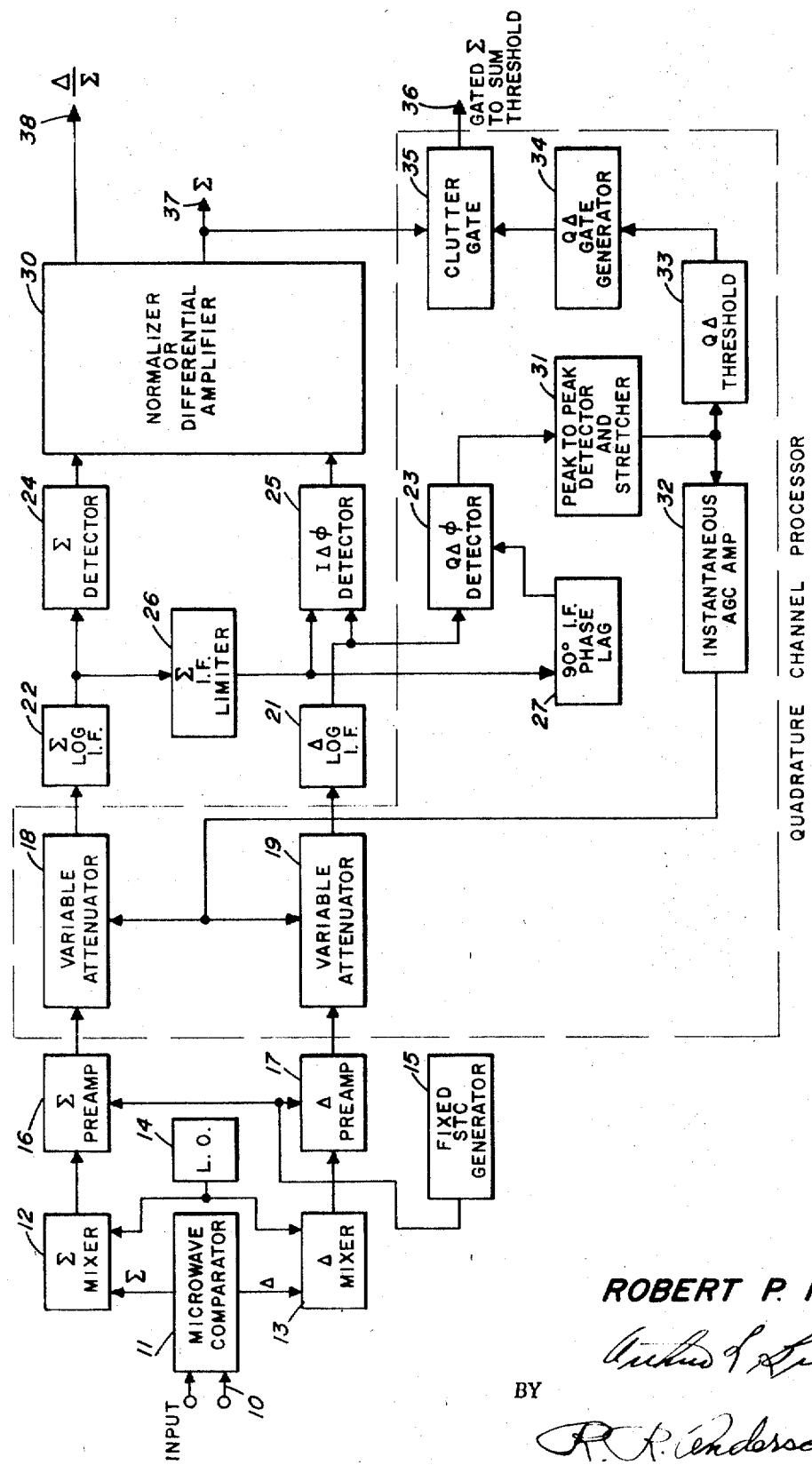
FIG. 1 shows a block diagram of the invention.

Referring now to FIG. 1, there will be seen a pair of input terminals 10, each one of which is connected to one of the pair of antennas commonly used in monopulse radar. The two input terminals 10 lead to a microwave comparator 11, the output of comparator 11 being divided equally between a sum mixer 12 and a difference mixer 13. A local oscillator 14 feeds signals into both mixers 12 and 13 to set up new IF signals. The output of sum mixer 12 is fed to a sum preamplifier 16 where this signal is joined with the output from a fixed STC generator 15, the output of this preamplifier then being fed to a variable attenuator 18. The output of variable attenuator 18 is then fed through a sum log IF amplifier 22 to a sum detector 24, and a sum IF limiter 26. The output of sum IF limiter 26 divides and feeds as inputs to an inphase difference detector 25 and also a 90° IF phase lag 27. The outputs from sum detector 24 and inphase difference detector 25 re both used as a dual input to a normalizer 30. Note that the normalizer or differential amplifier 30 is not essential to the proper functioning of the invention and that the sum signal 36 could have been obtained directly from the sum detector 24. The normalizer 30 was used in this particular embodiment of the invention, however, since the difference to sum signal 38 coming from it is modified by the target extent to change the sensitivity of the angle tracking loop of an associated radar set.

Looking back to the difference channel there is shown that the signal from the difference preamplifier 17 feeds to a variable attenuator 19 and from there it goes to a difference log IF amplifier 21. From difference log amplifier 21 the output divides and goes to a quadrature phase difference detector 23 and also to the inphase difference detector 25. The output of 90° IF phase lag 27 also forms a second input to the quadrature difference phase detector 23. In order to form a feedback circuit, the output from quadrature difference phase detector 23 feeds to a peak-to-peak detector and stretcher 31 from whence it goes to an instantaneous AGC amplifier 32, whose output is divided between variable attenuator 18 and variable attenuator 19 as an automatic means of adjusting receiver gain inversely as a magnitude of received clutter echo or thermal noise. The output of peak-to-peak detector and stretcher 31 divides and also forms an input to a quadrature difference threshold 33 whose output feeds a quadrature difference gate generator 34 from whence the signal goes as an input to a clutter gate 35. The sum signal output from normalizer or differential amplifier 30 as appearing on terminal 37 also serves as a second input to clutter gate 35, the output of clutter gate 35 then appearing on terminal 36 will be the sum signal unless the magnitude of the output signal from the peak-to-peak detector and stretcher 31 exceeds the set value of the quadrature difference threshold 33. This causes the quadrature difference gate generator 34 to generate a gate which when applied to the clutter gate 35 attenuates the sum signal appearing at 36 and thereby reduces its effect further downstream in the radar set and external to this processor. The output signal amplitude from stretcher 31 will normally be held constant below the set value of the quadrature difference threshold 33 by the action of the IAGC amplifier 32 and the variable attenuators 18 and 19. The gains of the sum and difference circuits are reduced in proportion to the value of quadrature difference to sum signals performing the function of an automatic gain control, AGC, based on angular target extent. The action of the clutter gate 35 is to prevent large resultant sum signals from appearing at 36 caused by a sudden increase in clutter return too rapid to be compensated by the IAGC amplifier loop.

Turning now to the theory and operation of the present invention, it will be noted that the echo characteristics of targets having a large extent in angle such as weather clutter differ from those whose angle extent is small. The signature difference lies in a decorrelation of the phase of the monopulse difference signals relative to the phase of the monopulse sum signals for extended targets. This difference is shown graphically in FIGS. 2a AND 2b explained in the following paragraph.

A radar employing an ideal amplitude-monopulse angle-sensing antenna, i.e., one with two apertures having a common phase center and squinted defraction patterns, and looking at a single point source or target will produce sum and difference vectors which are in phase or separated by exactly 180°. The relative magnitude of the difference vector will be a measure of the angular displacement of the target from boresight. This phase relationship is degraded by displacement of the phase centers due to antenna tolerances and by the vector addition of random noise generated in the radar to the desired signals in each channel. In the practical amplitude-monopulse radar set with good signal-to-noise ratios (exceeding 14 db.) the component of difference error displaced ±90° from the sum signal vector (the quadrature error) for this point target will be quite small compared to the magnitude of the sum signal, FIG. 2a.

Multiple sources or targets at one range, which have a measurable extent in angle, can be shown by analysis to produce a quadrature signal which increases with source separation or target extent. Extended or multiple targets can be simulated on an instantaneous basis by two targets whose angular position, signal phase and amplitude may be varied at will. It can further be shown, by examination of the two target case, that the magnitude of the quadrature error signal relative to the sum signal is a measure of angular displacement between the targets, without regard to their nominal position in the pattern. In order to simulate the great number of scatterers in rain or widely dispersed clutter, the position and magnitude of the two sources must vary in a broadly statistical manner squinted will produce difference signals which vary in phase and amplitude with respect to the sum signals in essentially a random fashion, as shown in FIG. 2b.

Let us now briefly review how a quadrature error is produced by two point targets in a monopulse radar beam. The response of a particular monopulse antenna and comparator is the vector sum and difference of echo signals observed by two squinted patterns (A and B) having a common phase center and having a linear difference response as shown in FIG. 3.

These patterns are used to examine single and twin targets both on boresight and off. It is possible to show graphically how the resultant difference error vectors are generated. The phase delay between the two targets has been chosen as 90° as this would represent two targets whose signal vectors naturally add in Root-Sum-Square (RSS) fashion.

Figure 4:
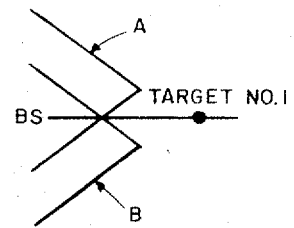
FIG. 4 shows the vector relationships of a single point target.
Figure 4:
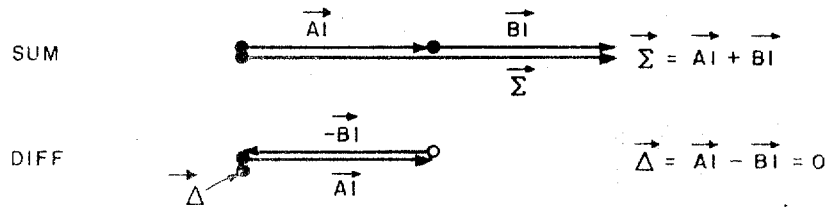
Figure 4:
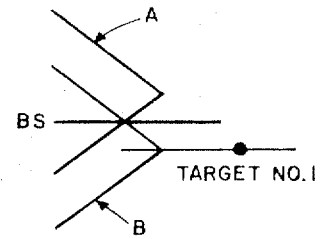
Figure 4:
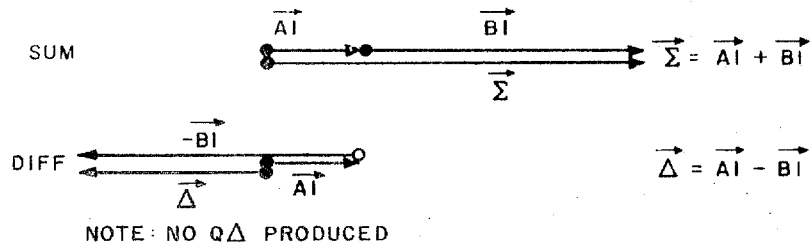

FIG. 4 is the vector diagram of the response of the antenna and comparator of FIG. 3 to a single target 1 of unit magnitude at angles of zero and minus 2 with respect to the boresight. Notice that the difference signal for a single point target will be zero, in phase or at 180° out of phase with respect to the sum signal and that no quadrature error is produced in either of the two cases considered.

Figure 5:
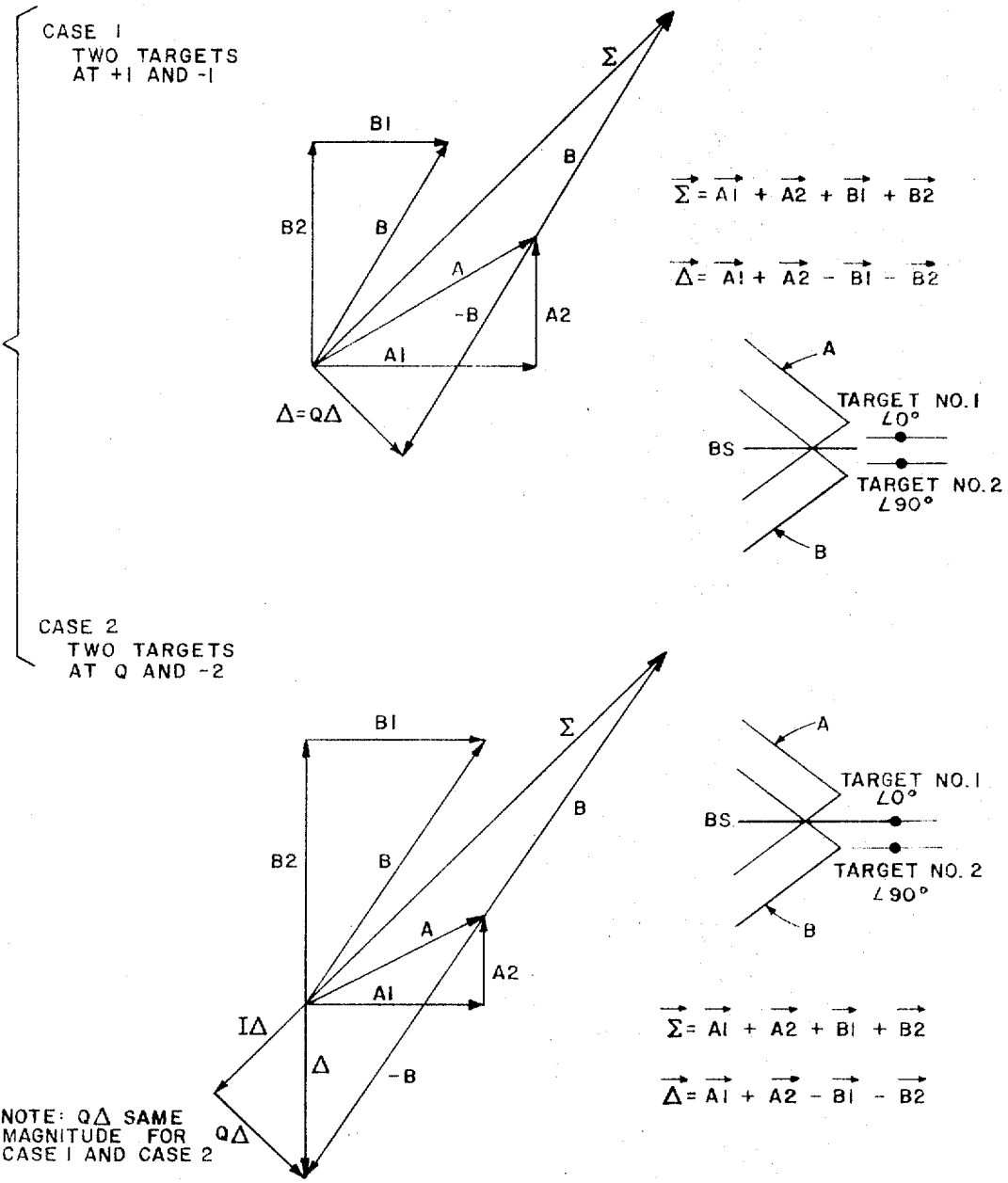
FIG. 5 shows the vector relationships for two equal targets separated in angle.
Figure 6:
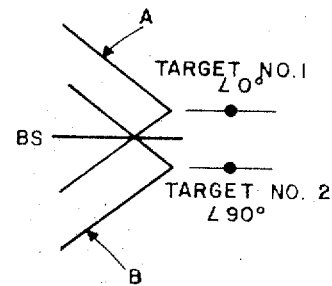
FIG. 6 shows the vector relationships for two equal targets with increased angle separation.
Figure 6:
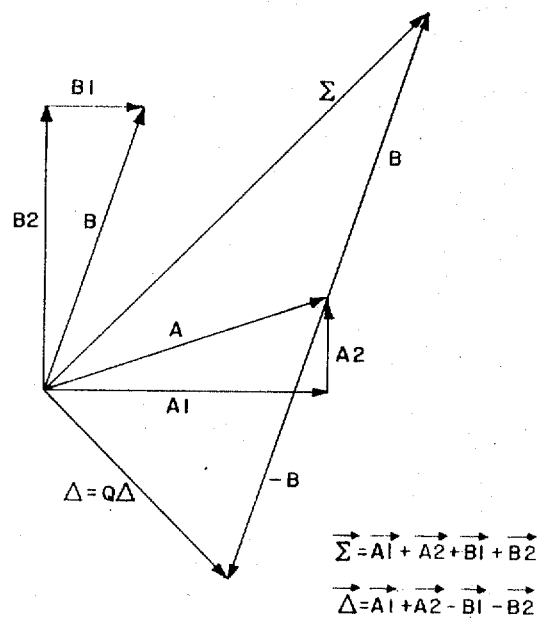

In FIG. 5, two targets 1 and 2 of unit magnitude are separated by a constant angle. They are considered as having a signal phase differing by 90°. Where the two targets are symmetrical about the boresight line only a quadrature error is produced. Where they are off center, the same quadrature error signal vector is produced, but, in addition, a normal difference error signal results. Where the target angular separation is increased as shown in FIG. 6, note that there is a corresponding increase in the magnitude of the quadrature error signal. As the monopulse antenna and comparator shown can only define signals into two sets, those producing a composite signal in channels A and B, respectively, any number of targets (or one target having large angular extent) may be represented, on an instantaneous basis, by only two targets.

Turning now to the implementation and performance of quadrature processing techniques it will be seen that this characteristic may be exploited by "Quadrature Channel Processing" which consists of determining the relative phase of the sum and difference signals or the magnitude of the quadrature component of the difference signal, and of modifying the characteristics of the receiver and/or thresholding device to prevent alarms on signals which are identified as clutter. One possible means for mechanizing this technique is shown in the block diagram of FIG. 1. The mechanization shown operates in the following manner.

Signals entering the antenna are assumed to be composed of desired target echoes and undesired clutter echoes. These are separated into sum and difference components by microwave comparator 11 and are amplified together with receiver thermal noise by preamps 16 and 17 before passing through attenuators 18, 19 and log IF 21 and 22. The magnitude of the difference echoes both in phase and in quadrature with the sum signal are phase detected by detectors 23 and 25. The detected signals in the quadrature difference channel are also entirely due to angle-extended clutter and thermal noise combined.

The signals in the sum and in phase difference channel contain essentially the same magnitude of clutter and thermal noise signal as the quadrature difference channel, but in addition contain signal due to the desired target echo. The magnitude of the quadrature difference channel signal is maintained at a chosen value by employing negative feedback to control the gain of the difference receiver through the operation of peak-to-peak detector and stretcher 31 and AGC amplifier 32, feeding back to variable attenuators, 18 and 19. The same gain control signal is used to equalize the gain of both the sum and difference receivers.

The signal in the quadrature difference channel due to clutter is noiselike in character in that it varies randomly in phase and magnitude with respect to the sum channel signal. As such, it will periodically approach zero. In order to prevent undue increase in sum receiver gain when the quadrature errors pass through zero, the error peaks are stretched by stretcher 31 to limit the speed of gain recovery long enough for the clutter signal to decorrelate in range and to cycle through a roughly complete set of amplitude variations. In addition, an adjustable quadrature difference threshold and sum channel blanking circuit composed of threshold 33, gate generator 34 and clutter gate 35 is provided to prevent alarms due to inherent delay in reducing the gain of the sum receiver as the peaks of the clutter signal increase rapidly.

Adjustment of the feedback path gain by AGC amplifier 32 and quadrature difference threshold 33 permit selection of a particular constant false alarm ratio (CFAR) by the sum channel threshold detector, which should remain essentially constant for all combinations of weather clutter and thermal noise.

Since the sum and in phase difference channels contain desired target energy, in addition to the noise and clutter energy being held constant, the output of the sum channel as applied to differential amplifier 30 is essentially proportional to target energy and the output of the inphase differential channel is essentially proportional to the angular position of the target. Due to the operation of the quadrature differential threshold and the "clutter gate" which is generated when that threshold is exceeded, sum signals will be sufficiently attenuated to prevent further processing by the sum signal threshold circuitry when they are suspected of containing excessive clutter echo.

This mechanization provides an automatic means of adjusting receiver gain inversely as the magnitude of received clutter echo or thermal noise. It then permits optimum detection of target echoes which exceed the adjusted value. Targets which have larger echoes than clutter or which appear in gaps in clutter can thus be detected without confusion.

Quadrature Channel Processing is also compatible with other recognition techniques such as circular polarization and pulse length discrimination. It may also be used in conjunction with any STC characteristics to reduce the dynamic range of automatic gain control required.

As the grazing angle approaches 90°, as in the case of side lobe returns from the terrain directly below the aircraft, return will be regarded as clutter and should not result in false alarms even where the reflectivity of the terrain is very high.

Note that while this technique does not of itself result in a subclutter visibility, it will, however, allow the receiver to operate at maximum usable sensitivity without false alarms at all times.

Having given in detail the structure and operation of the present device, it is apparent that there is disclosed a monopulse radar system which materially enhances the reception of signals even under the most adverse conditions of clutter and thermal noise through the generation of a quadrature error signal which is then used to control the gain or sensitivity of the monopulse receiver.

Obviously many modifications and variations of the present invention are possible in the light of the above teachings.

What I claim is:

1. A radar system for enhancing the reception of desired echoes comprising
    input means for receiving both desired and undesired signals;
    a microwave comparator coupled to the input means for establishing sum and difference signals;
    a sum signal receiver connected to the comparator for amplifying the sum signal;
    a difference signal receiver connected to the comparator for amplifying the difference signals;
    a sum signal detector coupled to the sum signal receiver;
    a quadrature difference phase detector connected to the sum signal receiver and to the difference receiver; and
    a gate circuit coupled to the quadrature difference phase detector and to the sum signal detector.

2. The system of claim 1 wherein the sum signal receiver and the difference signal receiver contain mixer, preamp, variable attenuator and IF circuits.

3. The system of claim 2 further including a feedback circuit from the quadrature difference phase detector to both variable attenuators in both receivers.

4. The system of claim 3 further including quadrature difference gate generator connected to the quadrature difference phase detector and the gate circuit to control the operation of the operation of the gate circuit.

5. The system of claim 4 further including a quadrature difference threshold coupled between the quadrature difference phase detector and the gate generator for setting the operating point of the generator and therefore the gate circuit.